US010802812B2

(12) United States Patent
Poenaru (10) Patent No.: US 10,802,812 B2
(45) Date of Patent: *Oct. 13, 2020

(54) LOW-POWER DEVICE RECOVERY USING A BACKUP FIRMWARE IMAGE

(71) Applicant: Infineon Technologies AG, Neubiberg (DE)

(72) Inventor: Dragos Ionel Poenaru, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,649

(22) Filed: Aug. 26, 2019

(65) Prior Publication Data

US 2019/0377564 A1 Dec. 12, 2019

Related U.S. Application Data

(63) Continuation of application No. 15/953,892, filed on Apr. 16, 2018, now Pat. No. 10,394,542.

(51) Int. Cl.

| G06F 8/61 | (2018.01) |
|---|---|
| H04L 1/08 | (2006.01) |
| G06F 3/06 | (2006.01) |
| G06F 11/14 | (2006.01) |
| H04B 7/24 | (2006.01) |
| G06F 8/65 | (2018.01) |

(52) U.S. Cl.
CPC ............... *G06F 8/63* (2013.01); *G06F 3/065* (2013.01); *G06F 3/0607* (2013.01); *G06F 3/0652* (2013.01); *G06F 3/0673* (2013.01); *G06F 11/1446* (2013.01); *H04L 1/08* (2013.01); *G06F 8/65* (2013.01); *H04B 7/24* (2013.01)

(58) Field of Classification Search
USPC .......................................................... 717/171
See application file for complete search history.

(56) References Cited

U.S. PATENT DOCUMENTS

| 5,726,541 A | 3/1998 | Glenn et al. | |
|---|---|---|---|
| 8,539,471 B2 * | 9/2013 | Morton | G06F 8/654 717/168 |
| 8,776,037 B2 | 7/2014 | Gee et al. | |
| 9,469,169 B1 | 10/2016 | Yu et al. | |

(Continued)

OTHER PUBLICATIONS

I. Sünter et al.; "Firmware Updating Systems for Nanosatellites"; IEEE Aerospace and Electronic Systems Magazine, v31 No. 5 (pp. 36-44); May 2016 (Year: 2016).*

(Continued)

*Primary Examiner* — Qing Chen
*Assistant Examiner* — Clint Thatcher
(74) *Attorney, Agent, or Firm* — Harrity & Harrity, LLP (57) ABSTRACT

Some examples described herein may involve receiving, via a wireless transmission, a firmware code update that is to be installed in a main memory of the electronic device, determining that the firmware code update is not successfully received; determining, based on determining that the firmware code update is not successfully received, that a secondary memory, of the electronic device, includes a firmware image; and installing the backup firmware image, from the secondary memory, in the main memory to provide the set of functionalities to the electronic device.

20 Claims, 7 Drawing Sheets

(56) References Cited

U.S. PATENT DOCUMENTS

| | | | |
|---|---|---|---|
| 9,513,900 B2* | 12/2016 | Wojcik | G06F 8/71 |
| 10,394,542 B1 | 8/2019 | Poenaru | |
| 2005/0132351 A1 | 6/2005 | Randall et al. | |
| 2010/0199272 A1 | 8/2010 | Mahajan et al. | |
| 2014/0130151 A1 | 5/2014 | Krishnamurthy et al. | |
| 2015/0371532 A1 | 12/2015 | Silva et al. | |
| 2016/0011887 A1 | 1/2016 | Chung et al. | |
| 2017/0031671 A1 | 2/2017 | Joshi et al. | |
| 2017/0123784 A1 | 5/2017 | Zymeri et al. | |
| 2019/0042228 A1* | 2/2019 | Nolan | G06F 8/654 |

OTHER PUBLICATIONS

"Firmware Utilization on Cloud (FUoC)"; IP.com Technical Disclosure (IPCOM000229401D) [full url in ref.]; Jul. 26, 2013 (Year: 2013).*

Wikipedia.org Website., "Read-only Memory," Feb. 20, 2018.

* cited by examiner

LOW-POWER DEVICE RECOVERY USING A BACKUP FIRMWARE IMAGE

BACKGROUND

Low-power electronic devices may be used in a variety of applications. The low-power electronic devices may be included on a single chip and be powered by a battery. In some instances, a low-powered electronic device may be configured to provide information to a master device. In one example, a low-power electronic device, such as a sensor device, includes one or more sensor elements configured to sense or measure one or more characteristics of an environment of the low-power electronic device. For example, such a sensor device may include one or more pressure sensor elements, temperature sensor elements, magnetic field sensor elements, a temperature sensor device, a magnetic field sensor device, an accelerometer, and/or the like.

SUMMARY

According to some implementations, an electronic device, implemented within a single chip may include a main memory; a secondary memory; one or more processors, communicatively coupled to the main memory and secondary memory, configured to: receive, via a wireless transmission, a firmware code update that is to be installed in the main memory, determine that the firmware code update is not successfully received, determine, based on determining that the firmware code update is not successfully received, that the secondary memory includes a backup firmware image, wherein the backup firmware image includes a set of functionalities for the electronic device, and install the backup firmware image, from the secondary memory, in the main memory to provide functionality to the electronic device; and a battery to supply power to the main memory, the secondary memory, and the one or more processors.

According to some implementations, a tire pressure monitoring system may include a sensor device, implemented within a single chip, to measure a tire pressure status of a tire, wherein the sensor device includes a reprogrammable memory and a non-programmable memory, and wherein the sensor device is configured to: receive a firmware code update that is to be installed in the reprogrammable memory, determine that the firmware code update is not successfully received, determine, based on determining that the firmware code update is not successfully received, that the non-programmable memory includes a firmware image, wherein the backup firmware image includes a set of functionalities for the sensor device, and install the backup firmware image, from the non-programmable memory, in the reprogrammable memory to provide functionality to the sensor device.

According to some implementations, a method performed by an electronic device may include receiving, via a wireless transmission, a firmware code update that is to be installed in a main memory of the electronic device, determining that the firmware code update is not successfully received, wherein, when the firmware code update is not successfully received, one or more functions of the electronic device are rendered inoperable; determining, based on determining that the firmware code update is not successfully received, that a secondary memory, of the electronic device, includes a firmware image, wherein the backup firmware image includes a set of functionalities for the electronic device; and installing the backup firmware image, from the secondary memory, in the main memory to provide the set of functionalities to the electronic device.

DETAILED DESCRIPTION

The following detailed description of example implementations refers to the accompanying drawings. The same reference numbers in different drawings may identify the same or similar elements.

In some instances, an electronic device, such as a low-power electronic device, is to be updated with new firmware (e.g., with update firmware code). The low-power device may receive the new firmware via a wireless communication (e.g., because the low-power device may not have wired connection capabilities). In such cases, the electronic device may include one or more memories for receiving and/or updating the firmware of the electronic device. However, if a failure occurs during an update to the firmware, the electronic device may be rendered inoperable. For example, a failure during an update to the firmware may leave the electronic device with partially updated firmware in a memory of the electronic device, with incorrect firmware in the memory of the electronic device, and/or the like that prevents the electronic device from being able to communicate with other devices and/or perform functions of the electronic device. When a sensor device is inoperable, the sensor device may be unable to sense one or more characteristics of an environment and/or transmit the one or more characteristics to another device (e.g., a master device). In some instances, when a firmware update fails (e.g., a firmware code update is not successfully installed), the electronic device may request a retransmission of the firmware update. However, if the retransmission of the firmware update fails and/or repetitive failures continue to occur, the frequent retransmissions may quickly drain a battery of the electronic device as processing transmissions may consume more power than other functions of the electronic device. Therefore, for a low-power device with non-rechargeable batteries, the lifespan of the low-power device can be shortened due to the retransmissions, as the battery power is depleted.

Some implementations described herein provide an electronic device (e.g., a low-power electronic device) recovery from failures (e.g., failures associate with receiving a firmware code update) using an operable backup firmware image stored in a secondary memory of the electronic device. In some implementations, the backup firmware image may restore basic functionality to the electronic device, such that the electronic device can indicate the presence of the electronic device to another device (e.g., the master device). The secondary memory may be non-programmable, such that the backup firmware image cannot be adjusted and/or lost due to a failure of the electronic device. As such, a failure, in association with a firmware update, can be addressed by restoring basic functionality to the electronic device such that the electronic device may indicate the failure to a master device without completely draining power from a battery of the electronic device. Accordingly, some implementations described herein may conserve power resources of an electronic device, thus increasing the lifespan of the electronic device, as low-power electronic devices may have a lifespan dependent on the life of the battery of the electronic device. Accordingly, increasing the lifespan of the electronic device may further conserve costs and/or hardware resources that may otherwise be used to replace the electronic devices when the electronic device runs out of power and/or fail.

Figure 1A:
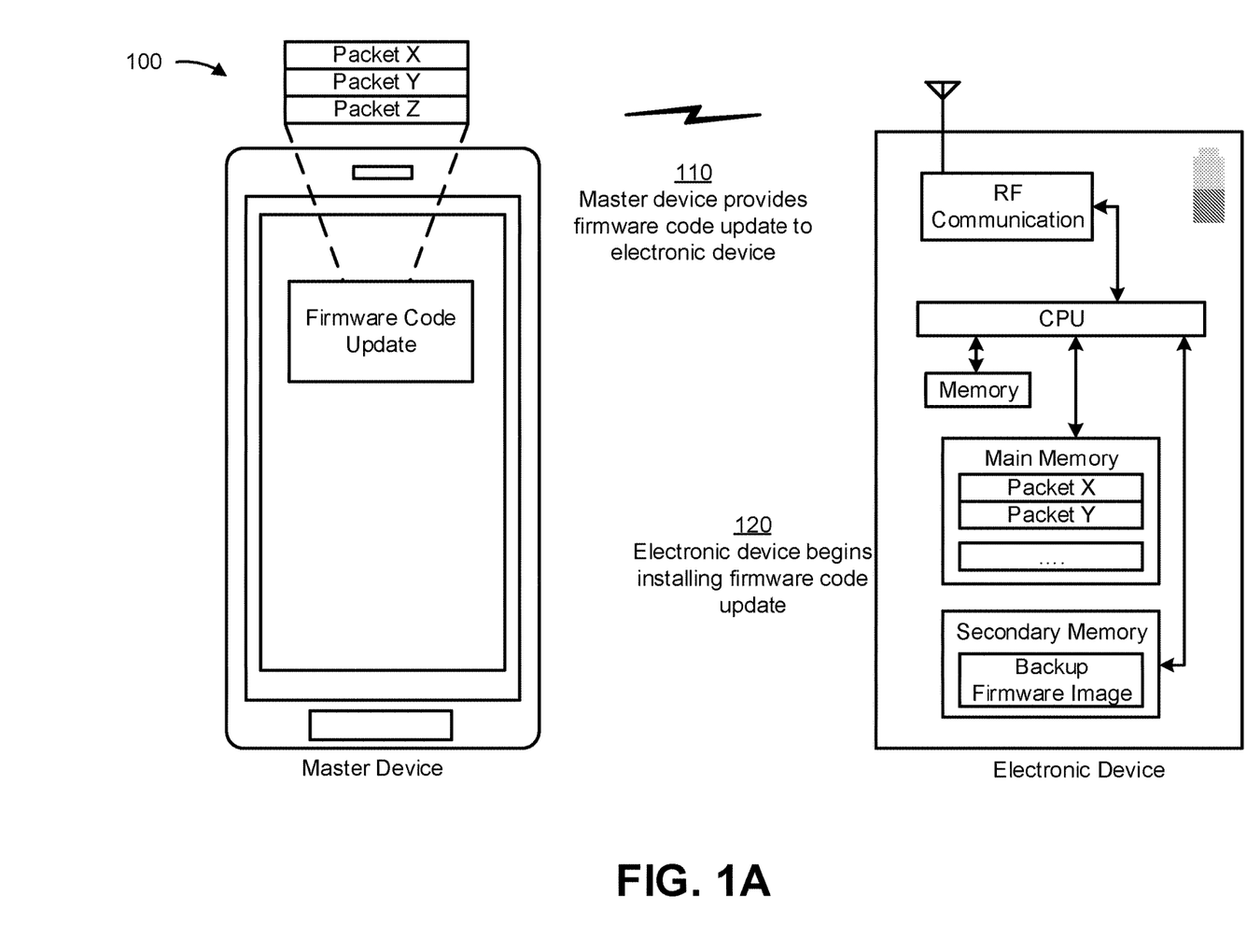
FIGS. 1A-1C are diagrams of an overview of an example implementation described herein.
Figure 1B:
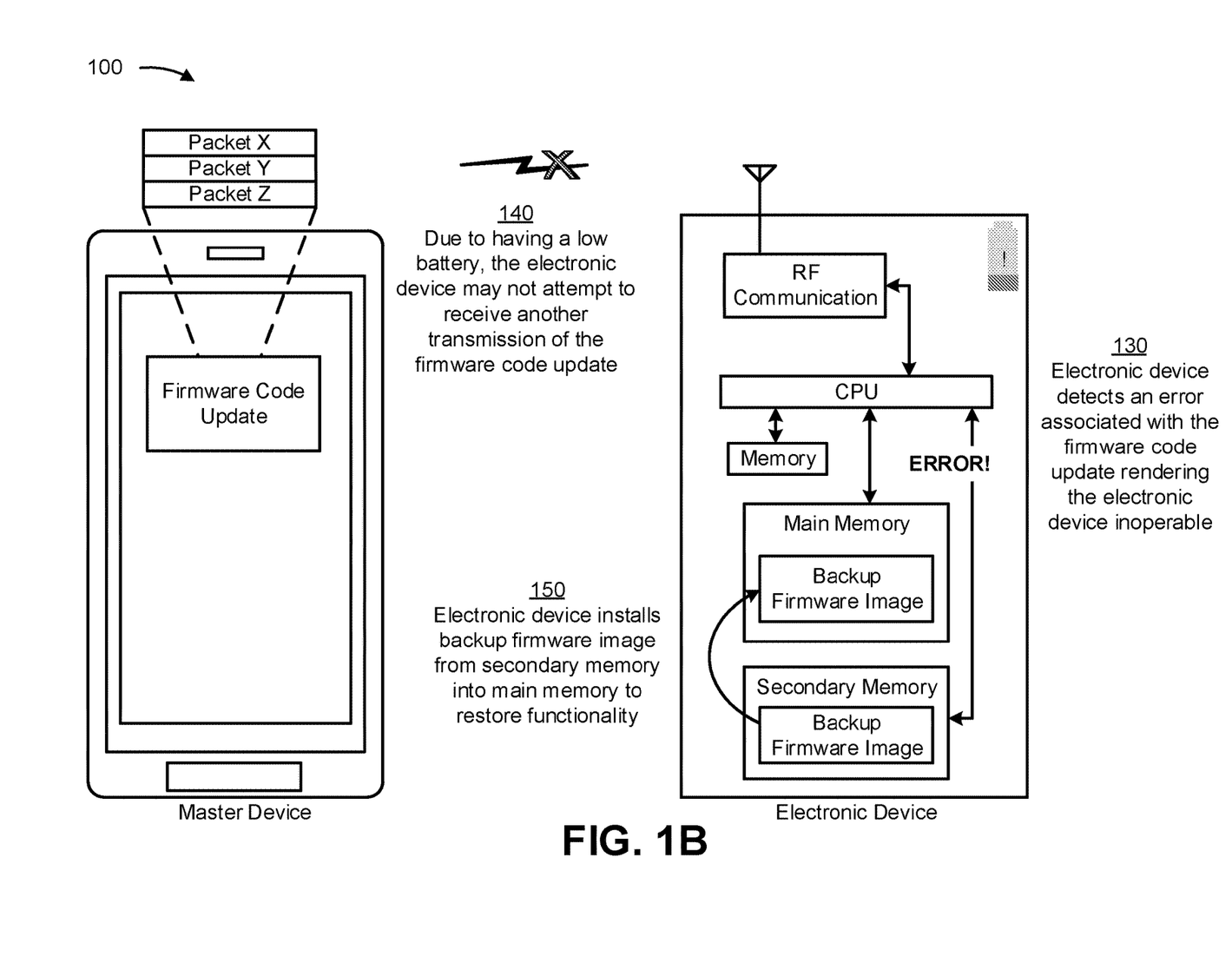
Figure 1C:
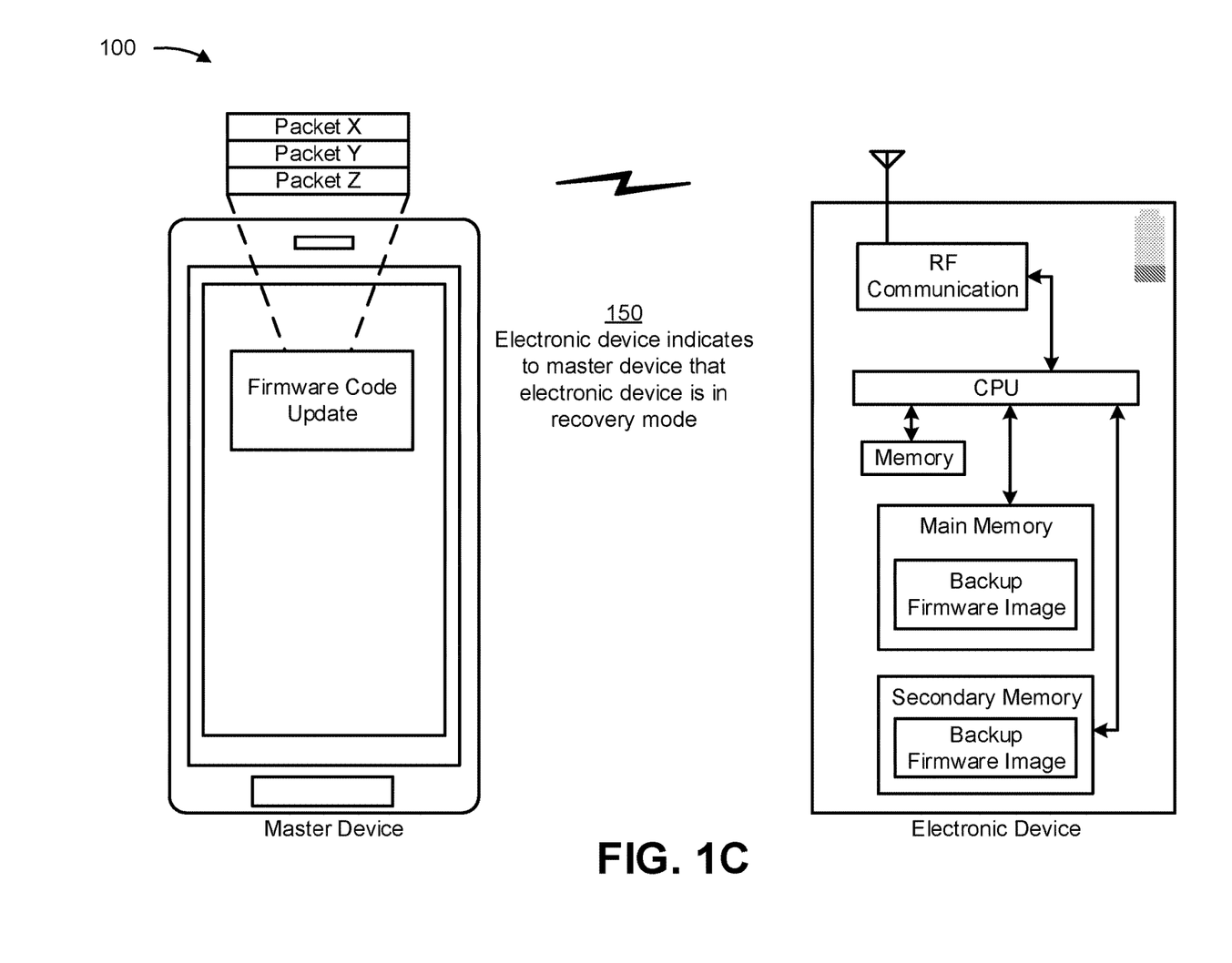

FIGS. 1A-1C are diagrams of an overview of an example implementation 100 described herein. Example implementation 100 includes a master device and an electronic device. The example master device may be a control device and/or monitoring device of a sensor system, and the electronic device may be a sensor device of the sensor system. In example implementation 100, a failure associated with receiving a firmware code update from a master device renders an electronic device inoperable, but functionality is restored to the electronic device using a backup firmware image in a secondary memory, according to some implementations described herein.

As shown in FIG. 1A, and by reference number 110, the master device provides a firmware code update to the electronic device. For example, the master device may send the firmware code update to the electronic device, packet by packet, via a wireless transmission. As shown, the firmware code update may include packet X, packet Y, and packet Z. As shown by reference number 120, the electronic device begins installing the firmware code update by installing packet X and packet Y in a main memory of the electronic device.

As shown in FIG. 1B, and by reference number 130, the electronic device detects an error (e.g., a failure) associated with the firmware code update that renders the electronic device inoperable. For example, the electronic device may detect a failure associated with the wireless transmission, a failure associated with the firmware code update, and/or a failure associated with the main memory. The electronic device may be rendered inoperable due to only a portion (e.g., only packet X and packet Y) being successfully installed in the main memory. As shown by reference number 140, due to having a low battery, the electronic device may not attempt to receive another transmission of the firmware code update from the master device. Accordingly, the electronic device may avoid wasting power on potential unsuccessful attempts at receiving the firmware code update. Rather, as shown by reference number 150, the electronic device installs a backup firmware image, from a secondary memory, into the main memory to restore functionality.

As shown in FIG. 1C, and by reference number 150, the electronic device may indicate to the master device that the electronic device is in recovery mode. For example, the electronic device may simply broadcast a signal (e.g., a beacon or ping) that indicates the presence of the electronic device and that the electronic device has limited functionality (e.g., functionality limited to communicating or receiving information from the master device). As such, the master device may be able to rediscover the electronic device and/or retransmit the firmware code update to the electronic device.

Accordingly, when the electronic device reaches a particular battery level, rather than continuing to spend power resources on attempting to receive wireless transmissions of the firmware code update that may ultimately continue to fail, the electronic device may conserve remaining battery power by installing the backup firmware image to restore functionality to the electronic device. As such, the electronic device may recover from the failure and place the electronic device in an operable state. In some instances, the electronic device may then be able to receive the firmware code update to resume normal operation without fully depleting the battery of the electronic device, which would permanently render the device inoperable (as the battery may not be rechargeable). Accordingly, the electronic device may further conserve costs, hardware resources, and/or processing resources that may otherwise be involved with replacing the electronic device.

Figure 2:
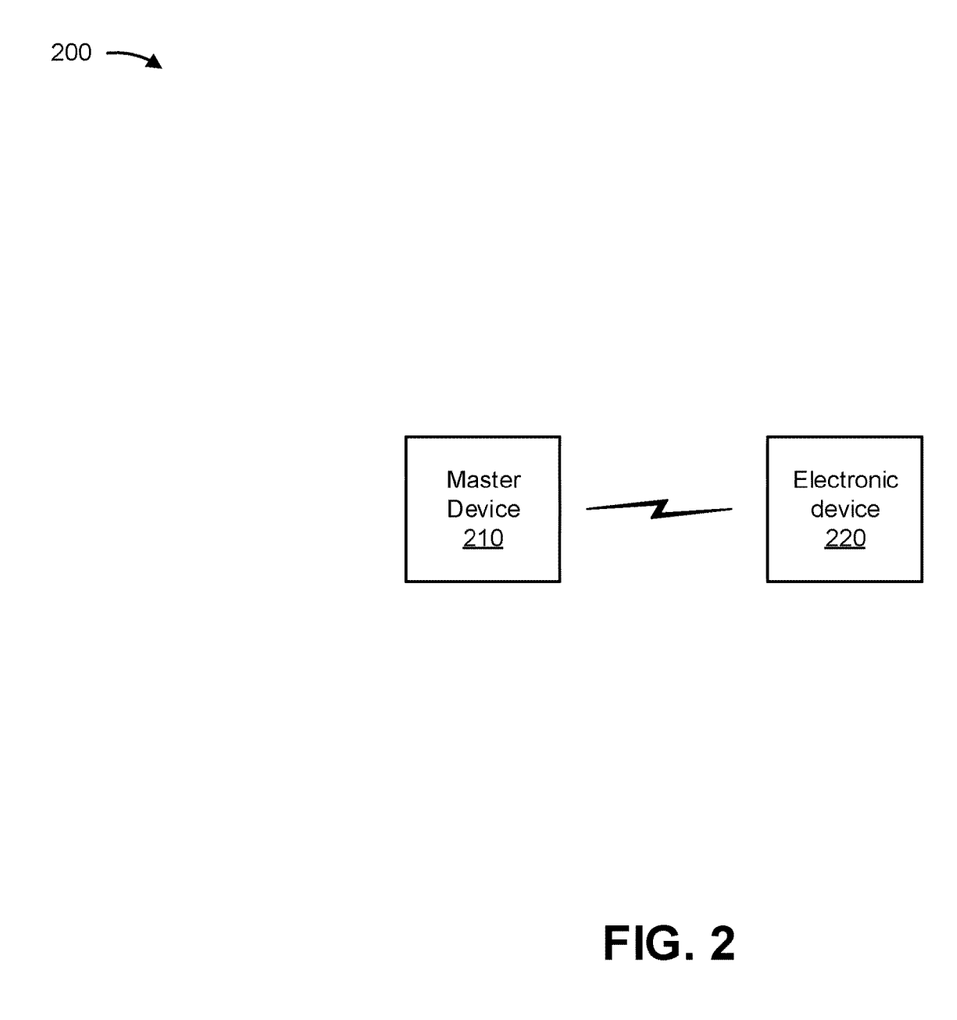
FIG. 2 is a diagram of an example environment in which systems and/or methods, described herein, may be implemented.

As indicated above, FIGS. 1A-1C are provided merely as an example. Other examples are possible and may differ from what was described with regard to FIGS. 1A-1C FIG. 2 is a diagram of an example environment 200 in which systems and/or methods, described herein, may be implemented. As shown in FIG. 2, environment 200 may include a master device 210 and an electronic device 220 (e.g., similar to the master device and electronic device of example implementation 100). Devices of environment 200 may interconnect via wireless connections.

Master device 210 includes one or more devices capable of receiving, generating, storing, processing, and/or providing information associated with information generated by or for electronic device 220. For example, master device 210 may include a communication and/or computing device, such as a control console (e.g., of a vehicle), a diagnostic device, a mobile phone (e.g., a smart phone, a radiotelephone, etc.), a laptop computer, a tablet computer, a handheld computer, or a similar type of device. Master device 210 may be configured to monitor and/or control electronic device 220. According to some implementations, master device 210 may be capable of providing firmware code update to electronic device 220 when electronic device 220 is to be updated. As such, master device 210 may be used to control and/or update electronic device 220.

Electronic device 220 includes one or more devices capable of receiving, generating, storing, processing, and/or providing information associated with an operation of master device 210. Electronic device 220 is low-power device or very low power device, such that electronic device 220 may be implemented within and/or by a single chip. Electronic device 220 may be associated with and/or include a battery for powering electronic device 220. In some implementations, the battery may not be rechargeable. In some implementations, electronic device 220 may be a sensor device (e.g., a sensor device of a tire pressure monitoring system, a sensor device of a temperature control system, a sensor device of a magnetic field sensing system, and/or the like).

The number and arrangement of devices and networks shown in FIG. 2 are provided as an example. In practice, there may be additional fewer devices and/or networks, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
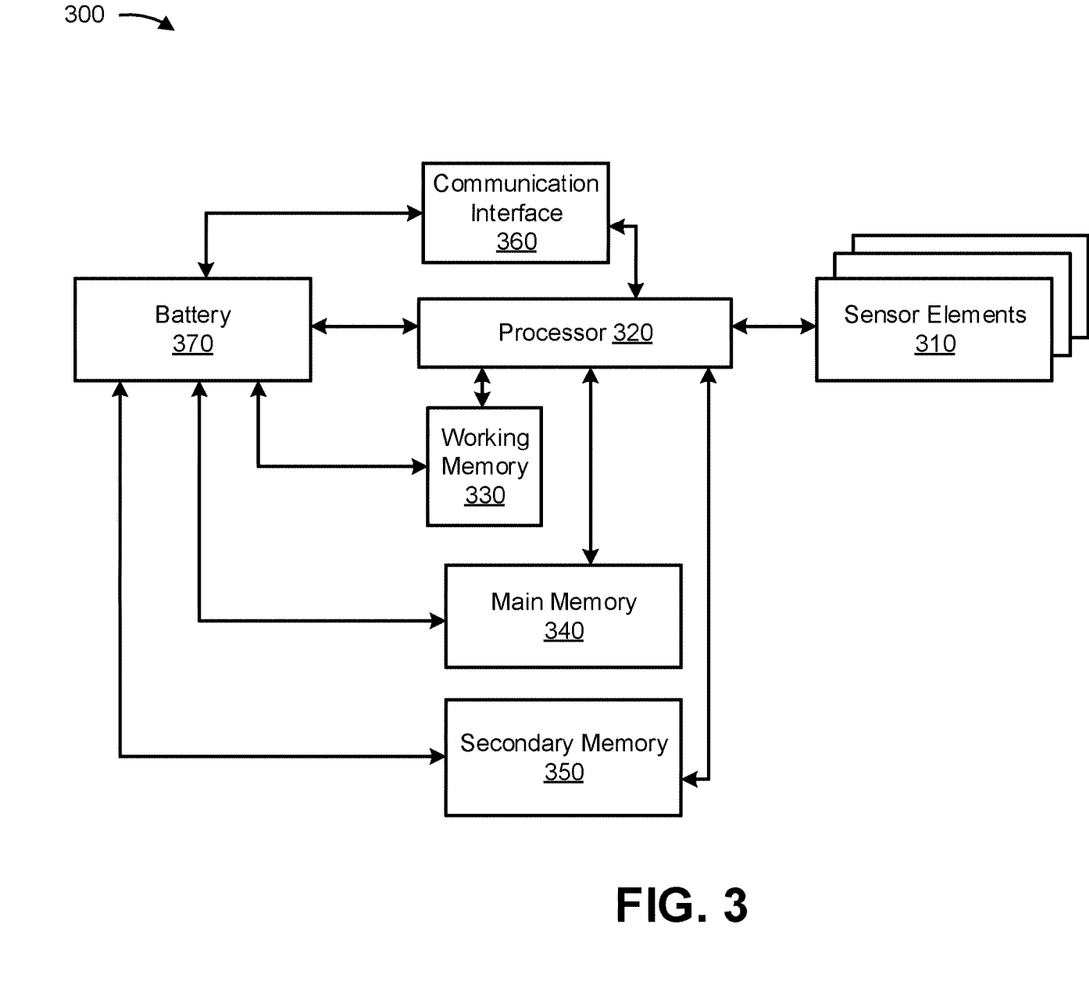
FIG. 3 is a diagram of example components of an electronic device of FIG. 2.

FIG. 3 is a diagram of example components of a device 300. Device 300 may be a device corresponding to electronic device 220. In some implementations, electronic device 220 may include one or more devices 300 and/or one or more components of device 300. As shown in FIG. 3, device 300 may include one or more sensor elements 310 (which may be referred to, herein, collectively as "sensor elements 310," or individually as "sensor element 310"), a processor 320, a working memory 330, a main memory 340, a secondary memory 350, a communication interface 360, and a battery 370.

Sensor element 310 may include an element for sensing one or more characteristics of an environment of device 300. For example, sensor element may include one or more components configured to sense a pressure, a temperature, a magnetic field, light, sound, and/or the like. More specifically, sensor element 310 may include a Hall-based sensor element that operates based on a Hall-effect. As another example, sensor element 310 may include a MR-based sensing element, elements of which are comprised of a magnetoresistive material (e.g., nickel-iron (NiFe)), where the electrical resistance of the magnetoresistive material may depend on a strength and/or a direction of a magnetic field present at the magnetoresistive material. In such cases, sensor element 310 may operate based on an anisotropic magnetoresistance (AMR) effect, a giant magnetoresistance (GMR) effect, a tunnel magnetoresistance (TMR) effect, and/or the like. As an additional example, sensor element 310 may include a variable reluctance (VR) based sensor element that operates based on induction.

Processor 320 is a central processing unit (CPU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function of device 300.

Working memory 330 may include a volatile memory (e.g., a random access memory (RAM)) and/or another type of dynamic that stores information and/or instructions for use by processor 320. For example, working memory 330 may be used to receive and/or perform a firmware code update and/or install a firmware image backup, according to some implementations described herein. In some instances, working memory 330 may have a much smaller capacity than main memory 340 (e.g., less than 10% of the capacity)

Main memory 340 may include a reprogrammable memory, such as a random access memory (RAM), and/or another type of dynamic memory (e.g., a flash memory, a magnetic memory, and/or an optical memory) that stores information and/or instructions for use by processor 320. According to some implementations, main memory may store a firmware code used to control device 300. As such, when an update to the firmware code is to occur, old firmware code in main memory 340 may be replaced with a new firmware code. In some implementations, a backup firmware image may be installed in main memory 340 to enable device 300 to recover from an inoperable state.

Secondary memory 350 may include a non-programmable memory (e.g., a read only memory (ROM)) or other type of memory (e.g., a flash memory, a magnetic memory, and/or an optical memory). According to some implementations, secondary memory 350 may store a backup firmware image, associated with device 300, that can be installed in main memory to enable device 300 to recover from a failure. According to some implementations, the backup firmware image can be installed during a configuration of device 300, during a manufacturing of device 300, during or after a firmware update to device 300, and/or the like. In some implementations, secondary memory 350 may be configured to store only the backup firmware image or only data associated with the backup firmware image.

A backup firmware image may include one or more executable codes or programs that enables or restores one or more functions to electronic device 220. For example, the functions may include basic functions, such as an ability for processor 320 to execute code of the backup firmware image, ability for processor 320 and/or communication interface 360 to broadcast or transmit a wireless signal indicating a presence of electronic device 220 (e.g., via a beacon or ping) to enable master device 210 to find or detect electronic device 220. Therefore, backup firmware image may include a program, that when executed by processor 320, is capable of communicating with another device (e.g., master device 210 or any other device) associated with electronic device 220. Accordingly, after being rendered inoperable, the backup target image may be installed to restore operability to electronic device 220.

According to some implementations, main memory 340 and secondary memory 350 may be implemented by different types of memory. For example, main memory 340 may be a reprogrammable memory and secondary memory 350 may be a non-programmable memory. In some implementations, secondary memory 350 may be implemented by a more robust memory technology (e.g., a ROM) than main memory 340 to ensure that secondary memory 350 is less likely to encounter failure than main memory 340. Accordingly, secondary memory 350 may be a reprogrammable memory and the secondary memory may be a non-programmable memory implemented by a different type of memory Communication interface 360 includes a transceiver-like component (e.g., a transceiver and/or a separate receiver and transmitter) that enables device 300 to communicate with other devices via a wireless connection. Communication interface 360 may permit device 300 to receive information from another device and/or provide information to another device. For example, communication interface 360 may include an optical interface, a coaxial interface, an infrared interface, a radio frequency (RF) interface, a Wi-Fi interface, a cellular network interface, or the like.

Battery 370 may include any type of battery suitable to provide power to device 300. For example, battery 370 may include one or more of a bobbin type battery, a spiral type battery, and/or the like. In some implementations, battery 370 may be configured to be permanently installed within device 300. For example, battery 370 may be soldered and/or included within a chip or package of device 300. In some implementations, battery 370 is not rechargeable. Accordingly, a maximum life span of device 300 may correspond to a length of time to deplete the power within battery 370. In some implementations, device 300 may be considered a low-power device and/or a very-low power device in that a majority of the consumption of the battery power, over the life of device 300, is spent on sending and/or receiving wireless transmissions.

Device 300 may perform one or more processes described herein. Device 300 may perform these processes based on processor 320 executing software instructions stored by a non-transitory computer-readable medium, such as working memory 330, main memory 340, and/or secondary memory 350. A computer-readable medium is defined herein as a non-transitory memory device. A memory device includes memory space within a single physical storage device or memory space spread across multiple physical storage devices.

Software instructions may be read into working memory 330, main memory 340, and/or secondary memory 350 from another computer-readable medium or from another device (e.g., master device 210) via communication interface 360. When executed, software instructions stored in working memory 330, main memory 340, and/or secondary memory 350 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
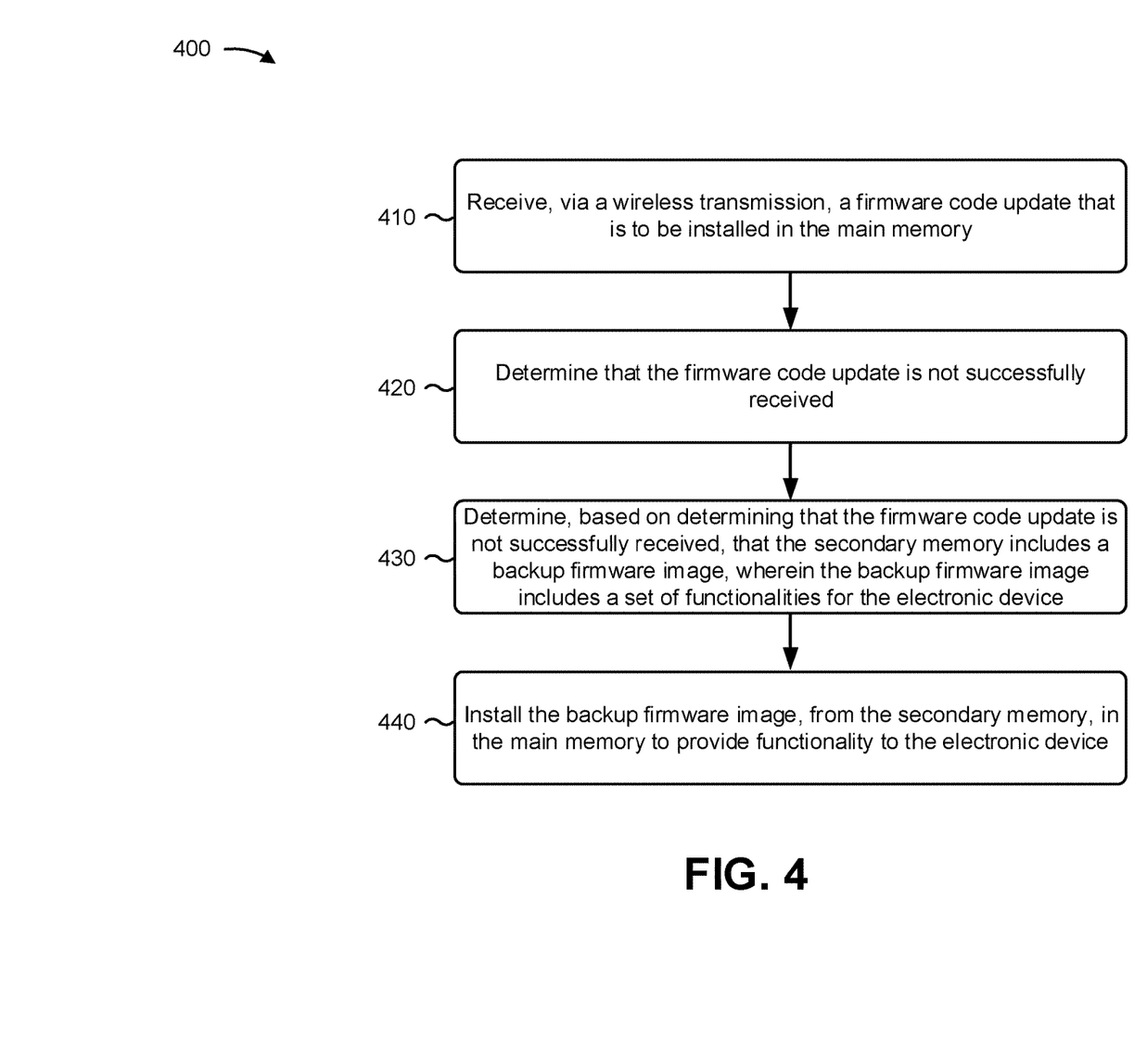
FIG. 4 is a flow chart of an example process associated with a low-power device recovery using a backup firmware image.

FIG. 4 is a flow chart of an example process 400 associated with a low-power device recovery using a backup firmware image. In some implementations, one or more process blocks of FIG. 4 may be performed by electronic device 220. In some implementations, one or more process blocks of FIG. 4 may be performed by another device or a group of devices separate from or including electronic device 220, such as master device 210.

As shown in FIG. 4, process 400 may include receiving, via a wireless transmission, a firmware code update that is to be installed in the main memory (block 410). For example, electronic device 220 (e.g., using processor 320, communication interface 360, and/or the like), may receive the firmware code update from master device 210. In some implementations, electronic device 220 receives the firmware code update based on being powered on, based on master device 210 sending the firmware code update, based on firmware of electronic device 220 being outdated, and/or the like.

According to some implementations, the firmware code update may include a new target image for a firmware of electronic device 220. The firmware code update may be transmitted, via the wireless transmission, within a series of packets. As such, in order for the firmware code update to be successfully received, all packets of the firmware code are to be received and successfully installed (e.g., in main memory 340). In some implementations, electronic device 220 may receive only a portion of the firmware code update (e.g., resulting in the firmware code update not being successfully received). For example, due to packet loss within the wireless transmission, only a portion of the packets of the firmware code update may be received.

In some implementations, the wireless transmission may be a radio frequency (RF) transmission from master device 210. For example, the wireless transmission may be a broadcast of a signal from master device 210 to update electronic device 220 and/or control electronic device 220.

In this way, electronic device 220 may receive the firmware to permit electronic device 220 to attempt to install the firmware code update in main memory 340.

As further shown in FIG. 4, process 400 may include determining that the firmware code update is not successfully received (block 420). For example, electronic device 220 (e.g., using processor 320) may determine that the firmware code update is not successfully received.

In some implementations, electronic device 220 may determine the firmware code update is not successfully received based on detecting a failure associated with the firmware code update, based on detecting a failure associated with the wireless transmission (e.g., packet loss, interference, and/or the like), based on detecting a failure associated with installing the firmware code update in main memory 340, and/or the like. For example, electronic device 220 may determine that the firmware code update was not successfully received based on one or more of the firmware code update being corrupt, based on the firmware code update failing an integrity check (e.g., a cyclic redundancy check (CRC)), based on the firmware code update failing an authentication check, and/or the like.

In some implementations, after determining the firmware code update was not successfully received, electronic device 220 may request that master device 210 resend the firmware code update (or at least a portion of the firmware code update (e.g., a portion of the firmware code update that was not successfully received)). Additionally, or alternatively, electronic device 220 may accept an update request from master device 210 to retransmit the firmware code update via a successive wireless transmission. In some implementations, prior to requesting a retransmission or accepting an update request, electronic device 220 may determine an amount of power remaining in battery 370. In such cases, if electronic device 220 determines that the amount of power satisfies a threshold, electronic device 220 may request or accept an update request for a successive transmission of the firmware code update. On the other hand, if the amount of power does not satisfy a threshold amount of power, electronic device 220 may not request a retransmission and/or may not accept the update request from master device 210.

Additionally, or alternatively, electronic device 220 may determine how many times the firmware code update has been transmitted to electronic device 220. In some implementations, if the number of wireless transmissions of the firmware code satisfies a threshold number of wireless transmissions (e.g., if the last wireless transmission of the threshold number of transmissions has been received), then electronic device 220 may not request or accept an update request from master device 210. On the other hand, if the number of transmissions does not satisfy the threshold, electronic device 220 may request or accept a request update to retransmit the firmware code update. As such, electronic device 220 may conserve power resources associated with receiving further transmissions of the firmware code update.

In some implementations, when electronic device 220 (e.g., via processor 320) determines that the firmware code update is not successfully received (e.g., after the wireless transmission, after a plurality of attempted retransmissions, and/or the like), electronic device 220 may determine that firmware code for operating electronic device 220 has failed. For example, upon receipt of a request to update the firmware code, the wireless transmission, or a first packet of the firmware code update, electronic device 220 may erase an old firmware code from main memory 340. As such, when the firmware code update is not successfully received, firmware code for operating electronic device 220 may be incomplete or non-existent due to the failure occurring while attempting to install the firmware code update. Therefore, when the firmware code is not successfully received, electronic device 220 may be rendered inoperable. In some instances, when inoperable, electronic device 220 may not be able to communicate with other devices (e.g., master device 210).

In this way, electronic device 220 may determine that the firmware code update was not successfully received to permit electronic device 220 to identify a backup firmware image to restore functionality to electronic device 220.

As further shown in FIG. 4, process 400 may include determining, based on determining that the firmware code update is not successfully received, that the secondary memory includes a backup firmware image, wherein the backup firmware image includes a set of functionalities for the electronic device (block 430). For example, electronic device 220 (e.g., using processor 320) may determine that secondary memory 350 includes a backup firmware image.

In some implementations, electronic device 220 may determine secondary memory 350 includes the backup firmware image based on determining the firmware code update was not successfully received, based on determining the firmware code update was not successfully received after a threshold number of retransmissions of the firmware code update, based on the backup firmware image being installed in secondary memory 350 (e.g., during configuration of electronic device 220), based on determining an amount of power to request or accept an update request for retransmission of the firmware code update does not satisfy a threshold amount of power, and/or the like.

In this way, electronic device 220 may determine the backup firmware image is in secondary memory 350 to permit electronic device 220 to install the backup firmware image in main memory 340 and restore functionality to electronic device 220.

As further shown in FIG. 4, process 400 may include installing the backup firmware image, from the secondary memory, in the main memory to provide functionality to the electronic device (block 440). For example, electronic device 220 (e.g., using processor 320, working memory 330, and/or the like) may install the backup firmware image in main memory 340 to restore functionality to electronic device 220. In some implementations, electronic device 220 may install the backup firmware image in main memory 340 based on determining that secondary memory 350 includes the backup firmware image, based on battery 370 not having a threshold amount of power, based on the firmware code update not being successfully received after a threshold number of transmissions of the firmware code update, and/or the like.

In some implementations, before installing the backup firmware image, electronic device 220 may erase main memory 340 (e.g., to erase any portions of the firmware code update that were installed or written to main memory 340). According to some implementations, electronic device 220 may install the backup firmware image in main memory 340 from secondary memory 350 by copying the backup firmware image into working memory 330 and writing the backup firmware image from working memory 330 into main memory 340.

In some implementations, using functionality of the backup firmware image, electronic device 220 may transmit a beacon to master device 210 to indicate that electronic device 220 has been recovered from a failure associated with the firmware code update. In some implementations, after being detected by master device 210 following installation of the backup firmware image, electronic device 220 may receive the firmware code update via one or more subsequent wireless transmissions from master device 210.

In this way, electronic device 220 may install the backup firmware image in main memory 340 to provide and/or restore functionality to electronic device 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
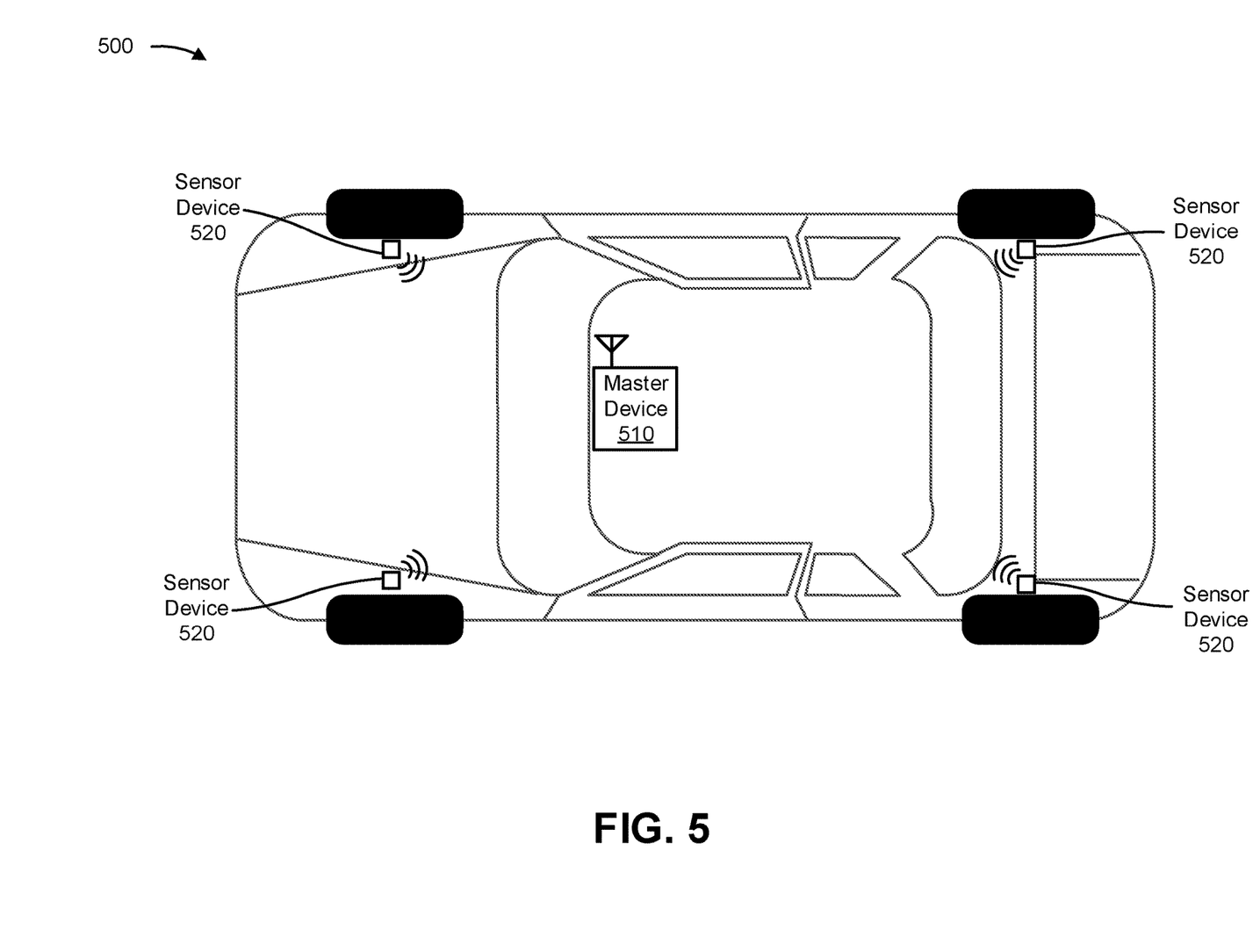
FIG. 5 is a diagram of an example system that may include one or more devices associated with the process shown in FIG. 4.

FIG. 5 is a diagram of an example system 500 that may include one or more devices associated with process 400 shown in FIG. 4. Example system 500 of FIG. 5 may include a tire pressure sensor monitoring system (TPMS). Example system 500 includes a master device 510 and one or more sensor devices 520 to monitor the tire pressure of tires of a vehicle. The master device 510 may monitor the tire pressure of the tires using the sensor devices 520.

The example sensor devices 520 of example system 500 may be implemented by electronic device 220 of FIG. 2 according to examples described herein. Accordingly, sensor elements in sensor device may sense the pressure in the tires and provide information associated with the pressure in the tires to master device 510, which may be implemented by master device 210 of FIG. 2. As such, when master device 510 is to update firmware of sensor device 520, master device 510 may send a firmware code update to one or more of the sensor device 520. In such cases, if one or more of the sensor devices 520 encounters a failure while receiving the firmware code update and/or is rendered inoperable, sensor devices 520 may recover from the failure using a backup firmware image stored in a secondary memory, as described herein.

As such, power resources, costs, hardware resources, and/or processing resources associated with replacing the sensor devices 520 of the example system 500 may be conserved according to implementations described herein.

As indicated above, FIG. 5 is provided merely as an example. Other examples are possible and may differ from what was described with regard to FIG. 5.

Some implementations described herein prevent power from being drained from a battery of an electronic device (e.g., a low-power electronic device) due to repeated transmissions of a firmware code update to the electronic device. As such, the power resources of a low-power electronic device can be conserved to extend the life span of the low-power electronic device by using a backup firmware image stored in a secondary memory of the electronic device. Therefore, costs, hardware resources, and/or processing resources associated with replacing the electronic device can also be conserved.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a device, that a firmware code update that is to be installed in the device is not successfully received;
   determining, by the device and based on determining that the firmware code update is not successfully received, an amount of power remaining in a battery of the device; and
   installing, by the device and based on determining that the amount of power remaining in the battery does not satisfy a threshold, a backup firmware to provide a set of functionalities to the device.

2. The method of claim 1, further comprising:
   determining that a backup memory is stored in a memory of the device; and
   wherein installing the backup firmware comprises:
      installing the backup memory from the memory.

3. The method of claim 1, further comprising:
   detecting a failure associated with at least one of:
      a transmission of the firmware code update,
      the firmware code update, or
      a memory of the device; and
   wherein determining that the firmware code update is not successfully received comprises:
      determining, based on detecting the failure, that the firmware code update is not successfully received.

4. The method of claim 1, further comprising:
   broadcasting a signal indicating that the device has limited functionality.

5. The method of claim 4, further comprising:
   receiving, based on broadcasting the signal, another transmission of the firmware code update.

6. The method of claim 1, further comprising:
   determining, based on determining that the firmware code update is not successfully received, that the amount of power remaining in the battery satisfies the threshold; and
   sending, based on determining that the amount of power remaining in the battery satisfies the threshold, a request for at least a portion of the firmware code update to be resent.

7. The method of claim 6, further comprising:
   determining, based on sending the request, that a successive transmission of the firmware code update failed;
   wherein determining the amount of power remaining in the battery comprises:
      determining, based on determining that the successive transmission of the firmware code update failed, the amount of power remaining in the battery; and
   wherein installing the backup firmware comprises:
      installing, based on determining that the amount of power remaining in the battery does not satisfy the threshold, the backup firmware.

8. A device, comprising:
   one or more memories; and
   one or more processors communicatively coupled to the one or more memories, configured to:
      determine that a firmware code update that is to be installed in the device is not successfully received;
      determine, based on determining that the firmware code update is not successfully received, an amount of power remaining in a battery of the device; and
      install, based on determining that the amount of power remaining in the battery does not satisfy a threshold, a backup firmware to provide a set of functionalities to the device.

9. The device of claim 8, wherein the one or more processors are further configured to:
   determine that the backup firmware is stored in a memory of the device; and
   wherein the one or more processors, when installing the backup firmware, are configured to:
      install the backup firmware from the memory.

10. The device of claim 8, wherein the one or more processors are further configured to:
    detect a failure associated with at least one of:
       a transmission of the firmware code update,
       the firmware code update, or
       a memory of the device; and
    wherein the one or more processors, when determining that the firmware code update is not successfully received, are configured to:
       determine, based on detecting the failure, that the firmware code update is not successfully received.

11. The device of claim 8, wherein the one or more processors are further configured to:
    broadcast a signal indicating that the device has limited functionality.

12. The device of claim 11, wherein the one or more processors are further configured to:
    receive, based on broadcasting the signal, another transmission of the firmware code update.

13. The device of claim 8, wherein the one or more processors are further configured to:
    determine, based on determining that the firmware code update is not successfully received, that the amount of power remaining in the battery satisfies the threshold; and send, based on determining that the amount of power remaining in the battery satisfies the threshold, a request for at least a portion of the firmware code update to be resent.

14. The device of claim 13, wherein the one or more processors are further configured to:
  determine, based on sending the request, that a successive transmission of the firmware code update failed;
  wherein the one or more processors, when determining the amount of power remaining in the battery, are configured to:
    determine, based on determining that the successive transmission of the firmware code update failed, the amount of power remaining in the battery; and
  wherein the one or more processors, when installing the backup firmware, are configured to:
    install, based on determining that the amount of power remaining in the battery does not satisfy the threshold, the backup firmware.

15. A non-transitory computer-readable medium storing instructions, the instructions comprising:
  one or more instructions that, when executed by one or more processors of a device, cause the one or more processors to:
    determine that a firmware code update that is to be installed in the device is not successfully received;
    determine, based on determining that the firmware code update is not successfully received, an amount of power remaining in a battery of the device; and
    install, based on determining that the amount of power remaining in the battery does not satisfy a threshold, a backup firmware to provide a set of functionalities to the device.

16. The non-transitory computer-readable medium of claim 15, wherein the one or more instructions, when executed by the one or more processors, further cause the one or more processors to:
  determine that the backup firmware is stored in a memory of the device; and
  wherein the one or more instructions, that cause the one or more processors to install the backup firmware, cause the one or more processors to:
    install the backup firmware from the memory.

17. The non-transitory computer-readable medium of claim 15, wherein the one or more instructions, when executed by the one or more processors, further cause the one or more processors to:
  detect a failure associated with at least one of:
    a transmission of the firmware code update,
    the firmware code update, or
    a memory of the device; and
  wherein the one or more instructions, that cause the one or more processors to determine that the firmware code update is not successfully received, cause the one or more processors to:
    determine, based on detecting the failure, that the firmware code update is not successfully received.

18. The non-transitory computer-readable medium of claim 15, wherein the one or more instructions, when executed by the one or more processors, further cause the one or more processors to:
  broadcast a signal indicating that the device has limited functionality.

19. The non-transitory computer-readable medium of claim 18, wherein the one or more instructions, when executed by the one or more processors, further cause the one or more processors to:
  receive, based on broadcasting the signal, another transmission of the firmware code update.

20. The non-transitory computer-readable medium of claim 15, wherein the one or more instructions, when executed by the one or more processors, further cause the one or more processors to:
  determine, based on determining that the firmware code update is not successfully received, that the amount of power remaining in the battery satisfies the threshold;
  send, based on determining that the amount of power remaining in the battery satisfies the threshold, a request for at least a portion of the firmware code update to be resent;
  determine, based on sending the request, that a successive transmission of the firmware code update failed;
  wherein the one or more instructions, that cause the one or more processors to determine the amount of power remaining in the battery, cause the one or more processors to:
    determine, based on determining that the successive transmission of the firmware code update failed, the amount of power remaining in the battery; and
  wherein the one or more instructions, that cause the one or more processors to install the backup firmware, cause the one or more processors to:
    install, based on determining that the amount of power remaining in the battery does not satisfy the threshold, the backup firmware.

* * * * *